United States Patent Office 3,694,370
Patented Sept. 26, 1972

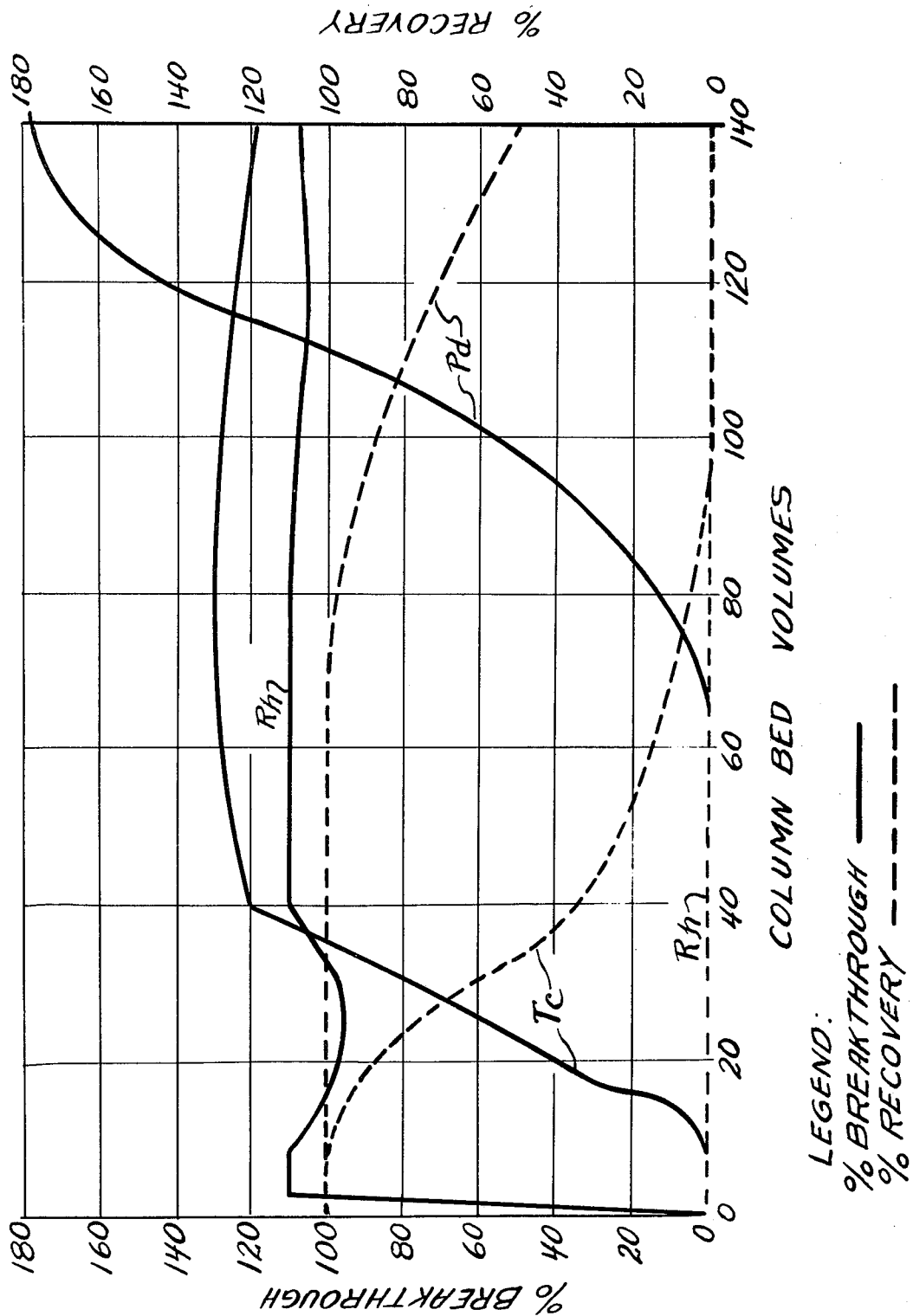

3,694,370
PROCESS FOR PALLADIUM RECOVERY
John V. Panesko, Richland, Wash., assignor to the United States of America as represented by the United States Atomic Energy Commission
Filed June 21, 1971, Ser. No. 155,013
Int. Cl. G21c 19/42
U.S. Cl. 252—301.1 R                   6 Claims

ABSTRACT OF THE DISCLOSURE

Palladium values are recovered from alkaline Purex supernatant waste feed solutions containing palladium, rhodium and technetium values by passing the solution through a bed of activated charcoal which selectively sorbs the palladium while permitting the other values to pass through the bed. The palladium values are recovered by elution with water and then with ammonium hydroxide.

CONTRACTUAL ORIGIN OF THE INVENTION

The invention described herein was made in the course of, or under, a contract with the United States Atomic Energy Commission.

BACKGROUND OF THE INVENTION

This invention relates to a process for recovering palladium values from alkaline Purex supernatant waste solutions containing palladium, rhodium and technetium values.

Palladium is often used in place of platinum where conditions permit because of its lower price and density. Its freedom from tarnish and resistance to corrosion make it almost as suitable as platinum for contacts in electrical equipment where low currents are carried. Palladium has also found use as an additive to increase the passivity of stainless steel and titanium, as well as in jewelry.

At present, palladium is obtained as a by-product along with the other platinum metals during the extraction of nickel and copper. As the demand for the platinum metals and particularly palladium increases, new sources must be made available. One such source is the stored waste solutions from the reprocessing of irradiated nuclear reactor fuel elements.

The slow-neutron fission of $^{235}U$ or $^{239}Pu$ in a nuclear reactor leads to the formation of lighter-weight isotopes between mass numbers 70 and 165. The majority of fission products have mass numbers of 86 to 109 and 128 to 150. The first group includes palladium, rhodium, technetium and ruthenium isotopes.

In the Purex process, spent reactor fuel elements are dissolved in $HNO_3$ and the actinides (Pu, U) are extracted into tributyl phosphate (TBP). The remaining aqueous wastes which contain the fission products, including palladium, rhodium and technetium are neutralized and pumped into large storage tanks for long-term storage to permit the high level radioactivity to decay to nonboiling levels, which is on the order of ten years for the aqueous Purex process wastes stored at the Hanford Atomic Works. During this period of storage, most of the fission products settle to the bottom of the tanks leaving most of the $^{137}$cesium and the palladium, rhodium and technetium values in the strongly alkaline supernatant referred to as the alkaline Purex supernatant waste solution. Removal of the $^{137}$cesium from the supernatant waste solution is then accomplished by passing the solution through an ion exchange column which retains the cesium and permits the palladium, rhodium and technetium values to pass through forming the alkaline Purex supernatant waste feed solution.

I have discovered a process by which the palladium is not only recovered from this Purex supernatant waste feed solution, but which will also separate the palladium from the rhodium and technetium values also present in the solution.

SUMMARY OF THE INVENTION

By my process, I have found that by passing the alkaline Purex supernatant waste feed solution, which is the alkaline Purex supernatant waste solution with the cesium values removed, through a bed of activated charcoal the palladium values are sorbed on the charcoal while most of the technetium values and all of the rhodium values pass through the bed with the effluent. The palladium values may then be readily eluted from the charcoal with water and then with ammonium hydroxide.

It is therefore one object of this invention to provide a process for the recovery of palladium values from alkaline Purex supernatant waste feed solutions.

It is another object of this invention to provide a process for the recovery of palladium values from rhodium and technetium values.

Finally it is the object of this invention to provide a one step process for the recovery and separation of palladium values from alkaline Purex supernatant waste solutions containing palladium, rhodium and technetium values.

BRIEF DESCRIPTION OF THE DRAWING

The drawing shows the relationship between breakthrough of palladium values in the effluent and percentage of their recovery.

DESCRIPTION OF THE PREFERRED EMBODIMENT

These and other objects may be met by passing alkaline Purex supernatant waste feed solution containing palladium, rhodium and technetium values through a bed of activated charcoal at ambient temperatures until palladium breakthrough occurs in the effluent, thus loading the charcoal with the palladium values and some technetium values while the remaining technetium values and the rhodium values pass through the bed in the effluent and thereafter eluting the palladium values with water.

Although the makeup of aged alkaline Purex supernatant waste feed solutions will vary slightly, the composition is generally as follows:

| | | |
|---|---|---|
| Nitrate | M | 0.5 |
| Nitrite | M | 2.0 |
| Carbonate | M | 1.0 |
| Sulfate | M | 0.3 |
| Sodium | M | 5.1 |
| Aluminum | M | 0.01 |
| pH | | 11–12 |
| Sp. G. | | 1.2 |

The waste solutions used in this study also contain about $10^{-4}$ M Rh, $10^{-4}$ M Pd and $10^{-4}$ M Tc in addition to about 0.05 Ci/gal. $Ru^{106}$ and 0.7 Ci/gal. $Cs^{137}$.

Separation of the palladium values from the rhodium and technetium values occurs during the loading step. As can be seen from the drawing, column loading of the activated charcoal bed results in 100% rhodium breakthrough immediately and 100% technetium breakthrough after 10 to 40 bed volumes of feed solution have passed through the bed. (The percent of breakthrough is defined as concentration of the values in the effluent divided by concentration of the values in the feed solution times 100. Bed volume is the volume of feed solution equal to the volume of the activated charcoal bed.) Initial palladium breakthrough occurs at 70 bed volumes followed by 100% breakthrough at about 110 bed volumes. It is noted from the drawing that at the time of palladium breakthrough there remains some technetium values on the charcoal bed, so that a greater percentage of palladium breakthrough results in less technetium remaining on the bed and palladium of greater purity being recovered. Thus at about 20% palladium breakthrough substantially all of the technetium values have been washed from the bed, although the total percentage of palladium recovery will be less due to loss of some palladium values into the effluent.

It should be noted that small amounts of gamma emitting fission products are generally present in the feed solution and will be sorbed onto the activated charcoal with the palladium values. These impurities may be washed from the bed with water, however, this will also result in a loss of palladium values. It was found that although 5 bed volumes of water will remove 90% of the fission product impurities it will also remove up to about ⅓ of the palladium values present on the bed. However, once eluted from the bed, the palladium values may be easily purified of the fission products by methods known to those skilled in the art.

The palladium values are recovered by passing water through to bed at ambient temperatures to elute most of the palladium values present. The remaining values are eluted with $NH_4OH$ solution. The use of a 10 M $NH_4OH$ solution in addition to the water wash was found to provide 100% recovery of the palladium values from the charcoal bed. The amount of eluent required will vary somewhat although 100% recovery of palladium values was achieved in one instance with 20 bed volumes of distilled water and 10 bed volumes of 10 M $NH_4OH$.

Any type of activated charcoal should work with the process described herein although exceptionally good results were achieved with activated coconut charcoal of —6 +14 mesh which weighed 512 grams per liter. A flow rate through a 25 ml. column of the charcoal at 100 ml./hr. was found satisfactory at room temperature.

It was found that the charcoal once used must be activated before it can subsequently be effectively reloaded with palladium values.

The following examples are given as illustrative of the process of the invention and are not to be taken as limiting the extent or scope of the invention.

EXAMPLE I

To illustrate the step of loading an activated charcoal bed with a palladium, a column containing 25 ml. of —6 +14 mesh activated coconut charcoal, Fisher Scientific Company #5-685, was prepared. A volume of 3500 ml. of alkaline Purex supernatant waste feed solution containing 14 µg./liter Pd, 18 µg./liter Rh and 24 µg./liter Tc was passed through the bed at a flow rate of 100 ml. per hour at ambient temperature. An analysis of the first 100 ml. through the column showed that the initial breakthrough and the 100% breakthrough of rhodium occurred almost simultaneously. The initial breakthrough of the technetium was observed in the 3rd 100 ml. sample while 100% breakthrough occurred in the 10th 100 ml. sample. Initial palladium breakthrough occurred with the 18th 100 ml. sample while 100% breakthrough occurred in the 28th 100 ml. sample.

EXAMPLE II

To illustrate elution of palladium values from an activated charcoal bed, 26 mg. of palladium was loaded on a 100 ml. bed of the charcoal described in Example I. 2000 ml. or 20 bed volumes of water at ambient temperature was passed through the bed at a flow rate of 100 ml./hr. In the same manner, two 500 ml. portions of 10 M $NH_4OH$ solution were also passed through the bed. In the subsequent analysis, 17 mg. of palladium was recovered from the water eluent while 9 mg. of palladium was recovered from the 1st 500 ml. portion of $NH_4OH$ solution to give 100% palladium recovery.

It can be seen from the above examples that high percentages of palladium recovery from the alkaline Purex supernatant waste feed solutions are achievable with the process of this invention, as well as good separations of palladium values from rhodium and technetium values present with the palladium in the Purex feed solution.

It will be understood that the invention is not to be limited to the details given herein but that it may be modified within the scope of the appended claims.

The embodiments of the invention in which an exclusive property or privilege is claimed are defined as follows:

1. A process for recovering palladium values from an alkaline supernatant waste feed solution containing palladium, rhodium and technetium values comprising:
   passing said feed solution through a bed of activated charcoal until palladium breakthrough occurs in the effluent whereby the palladium values and some of the technetium values are sorbed on the charcoal and the remaining technetium values and the rhodium values pass through the bed with the effluent, and thereafter recovering the sorbed palladium values.

2. The process of claim 1 whereby said feed solution is passed through said bed until 20% palladium breakthrough occurs in the effuent thus removing the sorbed technetium values from the bed.

3. The process of claim 2 wherein the pH of the feed solution is 11–12.

4. The process of claim 3 wherein the sorbed palladium values are recovered by passing $H_2O$ through the bed, thereby eluting most of the palladium values.

5. The process of claim 4 wherein the remaining palladium values are eluted with a solution of $NH_4OH$.

6. The process of claim 5 wherein the solution is 10 M in $NH_4OH$.

References Cited

Colvin, Recovery of Pd From Nuclear Waste Solutions Using a Packed Column of Tricapryl Monomethyl Ammonium Chloride on an Inert Support, Nuc. Sci. Abs. vol. 24, No. 1, Abst. No. 261, p. 28, 1969.

CARL D. QUARFORTH, Primary Examiner

R. L. TATE, Assistant Examiner

U.S. Cl. X.R.

23—312 R; 252—301.1 W